United States Patent [19]

Merrick et al.

[11] Patent Number: 4,584,459
[45] Date of Patent: Apr. 22, 1986

[54] SPRAY TRANSFER SELF-SHIELDED TUBULAR COMPOSITE HARD SURFACING ELECTRODE

[75] Inventors: Stanley J. Merrick; Robert F. Miller, both of York County, Pa.

[73] Assignee: Teledyne Industries, Inc., York, Pa.

[21] Appl. No.: 699,946

[22] Filed: Feb. 8, 1985

[51] Int. Cl.⁴ .............................................. B23K 35/22
[52] U.S. Cl. ............................. 219/146.1; 219/146.32
[58] Field of Search ............ 219/146.1, 146.24, 146.3, 219/146.31, 146.32, 146.41

[56] References Cited

U.S. PATENT DOCUMENTS

| | | | |
|---|---|---|---|
| 3,415,976 | 12/1968 | Smith | 219/146.3 X |
| 3,643,061 | 2/1972 | Duttera et al. | 219/146.1 |
| 3,947,655 | 3/1976 | Gonzalez et al. | 219/146.3 X |
| 4,451,508 | 5/1984 | Brown | 427/423 |

FOREIGN PATENT DOCUMENTS 654371  3/1979  U.S.S.R. ............................ 219/146.1

*Primary Examiner*—Clarence L. Albritton
*Assistant Examiner*—C. M. Sigda
*Attorney, Agent, or Firm*—Charles J. Long

[57] ABSTRACT

Addition of prescribed amounts of alloyed forms of at least one of magnesium, calcium, strontium and barium, preferably calcium, to the core of a tubular composite self-shielded arc welding electrode balanced to produce a hard surfacing weld deposit results in attractive smooth spray transfer operation. With electrodes producing deposits containing titanium carbide, the addition also improves the weld metal fluidity to a significant degree. Preferably, small quantities of unalloyed aluminum and magnesium are also added to the core for their beneficial effect in minimizing or eliminating weld metal porosity.

8 Claims, No Drawings

SPRAY TRANSFER SELF-SHIELDED TUBULAR COMPOSITE HARD SURFACING ELECTRODE

BACKGROUND OF THE INVENTION

1. Field of the Invention

This invention relates to tubular composite arc welding electrodes of the type comprising a metallic outer sheath and a core within and enclosed by the sheath. More particularly, the invention relates to such electrodes balanced to produce hard surfacing weld deposits in the open-arc, or self-shielded, welding process in which an improved core composition incorporating prescribed amounts of alloyed forms of at least one of the metals magnesium, calcium, strontium and barium provides spray transfer operation. With use in addition of defined quantities of unalloyed magnesium and aluminum, porosity is minimized or eliminated in deposits produced with our electrodes.

2. Description of the Prior Art

Numerous tubular composite electrodes have been developed by the prior art for use in automatic and semi-automatic electric arc hard surfacing processes; among these are those known as self-shielded electrodes, in which components in the core of the electrode provide arc shielding so that no external shielding source is required during the welding operation.

While self-shielded tubular hard surfacing electrodes of many kinds have been largely successful and widely used, a continuing problem, especially with prior art electrodes producing deposits containing titanium carbide (TiC electrodes), has been that arc transfer with such electrodes is what is known in the art as "globular", an unattractive transfer mode characterized by large balls of molten weld metal dropping from the electrode tip to the molten weld pool. In addition, weld metal from such prior art self-shielded tubular TiC electrodes is undesirably low in fluidity, e.g., showing poor or no tie-in between adjacent beads. The transfer and fluidity problems have limited the practical deposit height with prior art TiC electrodes to two or three layers at most; above that height the globules or balls of transferring metal tend either not to fuse properly with the previously deposited metal or to fly in erratic directions from the electrode tip, frequently not landing on the deposit at all. Globular transfer also appears to have limited the amount of titanium carbide recoverable in deposits from tubular composite TiC electrodes such as those manufactured and sold by Teledyne McKay as TUBE-ALLOY ® 240 TiC-O, 258 TiC-O and 829-0.

Since it is often desirable and even necessary to apply multi-pass and multi-layer surfacing deposits on worn or wear-prone base materials, and since enhanced wear resistance could be achieved with higher TiC levels in deposits bearing such carbides, self-shielded tubular composite hard surfacing electrodes in which the foregoing problems are minimized or eliminated would have significantly broader utility and attractiveness than electrodes heretofore available.

SUMMARY OF THE INVENTION

We have discovered that the use of alloyed forms of one or more of the metals magnesium, calcium, barium and strontium in specified amounts as core components of self-shielded tubular composite hard surfacing electrodes results in smooth spray arc transfer characteristics which effectively eliminate the above discussed transfer-related problems of previously available self-shielded tubular composite hard surfacing electrodes. Calcium is the preferred metal, and we have found that use of an alloy of calcium and silicon as a vehicle for adding it improves weld metal fluidity with TiC electrodes to a level allowing much broader utility of such electrodes.

In accordance with the invention, we provide, in a self-shielded tubular composite arc welding electrode comprising a metallic outer sheath and a core within and enclosed by the sheath, of the type wherein the sheath and core are balanced to produce a hard surfacing weld deposit, the improvement which comprises providing, as a portion of the core, an alloyed form of one of the following listed metals in the amounts stated:

| Metal | Percent of Electrode Weight |
|---|---|
| Magnesium (Mg) | About 0.6 to about 1.8 |
| Calcium (Ca) | About 1 to about 3 |
| Strontium (Sr) | About 2.1 to about 6.6 |
| Barium (Ba) | About 3.4 to about 10.3 | whereby spray transfer operation is achieved.

In a preferred embodiment, the electrode core also includes, by weight of the electrode, from about 0.9 to about 2.3 percent aluminum metal (Al) and from about 0.2 to about 0.4, preferably about 0.3, percent magnesium metal (Mg).

Preferably, the metal is calcium, added as a calcium silicon alloy; a useful alloy contains about 33 weight percent calcium and about 61 weight percent silicon.

In another embodiment the metal is magnesium, added as a magnesium aluminum alloy; preferably such alloy contains from about 50 to about 65 weight percent magnesium, balance essentially aluminum.

In three preferred embodiments especially adapted to produce surfacing deposits containing effective amounts of titanium carbide, electrodes according to the invention have the following listed overall analytical ranges, including both core and sheath materials:

| Type of Weld Deposit Produced | Percent of Electrode Weight | | | | | |
|---|---|---|---|---|---|---|
| | C | Mn | Si | Cr | Mo | Ti |
| Martensitic | 1.7–3 | 1–2.4 | up to 3 | 6.2–8.4 | 1–2 | 4–8 |
| White Iron | 4–6 | 1.5–2.9 | up to 3 | 5.5–7.5 | | 6–9 |
| Hadfield Manganese | 1.5–3 | 15–18 | up to 3 | 2.5–4.5 | | 3–7 | the balance of the electrode in each case comprising alloyed forms of one of Mg, Ca, Sr, and Ba and unalloyed Mg and Al, all in the quantities set forth above, along with iron and unavoidable impurities.

In an embodiment incorporating more than one of the preferred alloyed metals, we provide, in a self-shielded tubular composite arc welding electrode comprising a metallic outer sheath and a core within and enclosed by said sheath, of the type wherein the sheath and core are balanced to produce a hard surfacing weld deposit, the improvement which comprises providing, as a portion of the core, an alloyed form of at least one of magnesium, calcium, strontium and barium in percentages by weight of the electrode such that the quantity $$\left[ \frac{\% \text{ Mg}}{.61} + \% \text{ Ca} + \frac{\% \text{ Sr}}{2.18} + \frac{\% \text{ Ba}}{3.43} \right]$$

equals from about 1 to about 3.

DESCRIPTION OF THE PREFERRED EMBODIMENTS

As is true with similar electrodes of the prior art, formulation of tubular composite electrodes according to the invention comprises metallurgically balancing the sheath and the metallic components of the core, including carbon (which is treated as a metal for formulation purposes), to produce any one of a number of suitable hard surfacing alloy deposits known to the art. Such balancing, commonly performed by those skilled in the art of tubular electrode formulation, involves consideration of losses of elements in crossing the welding arc, necessary deoxidation practice, and the aim analysis of the alloy which it is desired to deposit.

In manufacturing tubular composite electrodes according to the invention, the sheath material, supplied initially as flat strip, is first formed into a generally U-shaped trough; a mixture of powdered core materials including unalloyed and alloyed metals is then added, after which the sheath is further formed to tubular shape to surround the core and compress it slightly to prevent shifting thereof. After initial forming the tubular electrode is drawn or rolled from the as-formed diameter to the desired final diameter.

C 1008 steel is normally used as the sheath material of tubular composite electrodes according to the invention; depending on the particular hard surfacing alloy deposit desired, the "percent fill", i.e. the percentage of electrode weight taken up by the core, varies between about 20 and about 45 percent. Although the cores of prior art self-shielded tubular composite hard surfacing electrodes typically include small amounts of non-metallic powders such as calcium carbonate, fluorspar, and rutile or potassium titanate, which serve variously to stabilize and shield the arc and flux the molten weld pool, we have found that no non-metallic core ingredients are necessary in electrodes according to the invention; the special metallic core components which we add stabilize the arc significantly better than prior art core additions and appear to provide comparable arc shielding as well.

As set forth above, we have found that use of alloyed forms of magnesium, calcium, strontium or barium in the stated quantities provides spray arc transfer in self-shielded tubular composite hard surfacing electrodes and has additional important benefits in such electrodes formulated to produce titanium carbide bearing deposits. It should be noted that the amounts of magnesium, strontium and barium specified are all equivalent on a molecular weight basis to from about 1 to about 3 weight percent calcium. Alloyed forms of the specified metals have been found to be necessary in the practice of our invention, in part because of the virtual impossibility of obtaining unalloyed forms of, e.g., calcium, and also because use of the requisite quantities of those metals which are available in the unalloyed form, e.g. magnesium, can result in undesirable ignition of the metal in the arc heat, thereby impairing the beneficial effects of the metal on the transfer characteristics.

We have also found that, although use of the specified quantities and alloyed forms of magnesium, calcium, strontium or barium alone provides the desired spray transfer, the resulting weld deposits occasionally have somewhat more fine porosity than is desirable; addition of unalloyed magnesium and aluminum in respective amounts of from about 0.2 to about 0.4 and from about 0.9 to about 2.3 percent of the electrode weight helps to minimize or eliminate such porosity.

The optimum combination of our special core ingredients in self-shielded tubular composite electrodes according to the invention, so far as our work has shown, includes, by weight of the electrode, about 1 percent calcium in the form of a commercially available calcium silicon alloy powder containing about 32.6 percent calcium, 61.1 percent silicon, 4.2 percent iron and 0.4 percent carbon; about 0.9 percent unalloyed aluminum metal; and about 0.3 percent unalloyed magnesium metal. It should be understood that the term "unalloyed" is not intended to indicate absolute purity of the metal, but only that the metal does not contain any significant quantity of metallic or non-metallic impurities. For example, the aluminum metal we use is 99.3 weight percent minimum aluminum, and the magnesium metal is 98.0 weight percent minimum magnesium.

Further details, objects, and advantages of the invention will become apparent as the following description of certain present preferred embodiments thereof proceeds.

EXAMPLE 1

Prior Art

A self-shielded tubular composite electrode for depositing TiC containing martensitic weld metal, of the type marketed by Teledyne McKay as TUBE-ALLOY® 258 TiC-O, was fabricated using C1003 steel strip as the sheath; the core of the electrode comprised 29 percent of the electrode weight and was composed of the following listed granular ingredients in the stated weight percentages of the electrode: low carbon ferrochromiun (73% Cr), 10.2%; SiC (70% Si, 30% C), 0.9%; electrolytic manganese, 1.7%; low carbon ferromolybdenum (62.5% Mo), 2.3%; titanium carbide (73% Ti, 24% C), 8.1%, ferrotitanium (70% Ti), 1.2%; calcium carbonate, 0.6%; fluorspar ($CaF_2$), 3.8%; and potassium titanate, 0.3%. All core materials in this and all other examples described herein were sized to minus 30 U.S. mesh before being included in the core mixture. The electrode was drawn to 7/64" diameter and used to prepare a hard surfacing deposit with self-shielded semi-automatic welding under the following listed conditions: mild steel base plate, 450–500 amps, 25–27 volts, DC reverse polarity, $1\frac{1}{2}''$ stickout (distance from contact tip to end of electrode). Transfer was globular with large balls of molten metal crossing the arc, some porosity was noted, and the weld metal showed very poor fluidity and tie-in.

EXAMPLE 2

Invention

A self-shielded tubular composite electrode for depositing the same titanium carbide containing martensitic weld metal as in Example 1 was fabricated using C1008 steel strip as the sheath. In this example, however, the non-metallic core components of Example 1 were replaced by calcium-silicon alloy, aluminum and magnesium in accordance with the invention; in addition, some of the core components were changed from those in Example 1 for reasons of economy (e.g. titanium carbide was replaced by ferrotitanium and graphite) and to balance weld metal chemistry (e.g. silicon carbide was replaced by silicon in the calcium silicon alloy and carbon in high carbon ferrochromium and graphite). The core of Example 2 comprised 29 percent of the electrode weight and was composed of the following listed granular ingredients in the stated weight percentages of the electrode: high carbon ferrochromium (68% Cr, 6% C), 10.4%; electrolytic manganese, 1.5%; low carbon ferromolybdenum (62.5% Mo), 2.3% ferrotitanium (70% Ti), 8.7%; graphite, 1.7%; calcium-silicon alloy (32.5% Ca, 61% Si), 3.2% (giving about 1% calcium by weight of the electrode); unalloyed magnesium metal, 0.3%; and unalloyed aluminum metal 0.9%. The electrode was drawn to 7/64" diameter and used to prepare a self-shielded hard surfacing deposit under the same conditions as used in Example 1. In this case, arc transfer was of the smooth spray type, little or no weld metal porosity was observed, and the weld metal fluidity and tie-in were good, even in multiple layers where the Example 1 weld metal became unacceptable.

A comparison of analyses of major alloying elements in the electrodes of Examples 1 and 2 and the undiluted (i.e. free of metal from the base plate) weld metal from each is as follows (all amounts are percent by weight):

| | Example 1 | | Example 2 | |
|---|---|---|---|---|
| Element | Electrode | Weld Metal | Electrode | Weld Metal |
| C | 2.3 | 1.8 | 2.4 | 2.1 |
| Mn | 2.0 | 1.5 | 1.7 | 1.4 |
| Si | 0.7 | 0.7 | 2.1 | 2.2 |
| Cr | 7.5 | 7.5 | 7.2 | 7.2 |
| Mo | 1.4 | 1.5 | 1.4 | 1.6 |
| Ti | 6.9 | 4.7 | 6.0 | 5.7 |

It will be noted that even though the Example 1 electrode contained 0.9% more titanium than the Example 2 electrode, the weld metal of Example 2 contained 1% more titanium than that of Example 1. This significant improvement in recovery of titanium, 95% for Example 2 versus only 68% for Example 1, which resulted in the formation of a significantly increased quantity of TiC and a corresponding improvement in wear resistance in the Example 2 deposit, was quite surprising and appears to be an added benefit of our invention.

Several series of experiments using the basic electrode formulation of Example 2 showed that (a) calcium and not silicon caused the spray transfer to occur; (b) calcium is effective in amounts of from about 1 to about 3 percent of electrode weight when added in alloy form; (c) for optimum deposit soundness, tubular composite electrodes according to the invention should include unalloyed magnesium in quantities from about 0.2 to about 0.4, preferably about 0.3, weight percent and unalloyed aluminum in quantities of at least about 3 times the amount of magnesium, i.e. at least about 0.6, and preferably at least about 0.9 weight percent, although up to about 2.3 weight percent aluminum has been used with no significant adverse affects. Even without additions of unalloyed aluminum and magnesium, spray transfer is achieved in electrodes according to the invention, although some weld metal porosity occasionally occurs in such cases.

Additional calculations and experiments have indicated that alloyed forms of magnesium, strontium and barium have beneficial effects similar to those of calcium when used in amounts equal on a molecular basis to the above stated amounts of calcium. Since calcium is effective in amounts from about 1 to about 3 weight percent of the electrode, the equivalent weight percentage ranges of magnesium, strontium and barium are about 0.6 to about 1.8, about 2.1 to about 6.6, and about 3.4 to about 10.3 respectively when each is used alone (in alloyed form, of course); if more than one of the four metals are used, calculations show that a combining factor of $$\left[ \frac{\% \text{ Mg}}{.61} + \% \text{ Ca} + \frac{\% \text{ Sr}}{2.18} + \frac{\% \text{ Ba}}{3.43} \right]$$

should be equal to from about 1 to about 3 for effective results.

EXAMPLES 3 AND 4

Self-shielded tubular composite electrodes for depositing TiC bearing deposits corresponding to those from electrodes marketed by Teledyne McKay as TUBE-ALLOYS 240 TiC-O (White iron—Example 3) and 829-0 (Hadfield manganese—Example 4) were fabricated using C1008 steel strip as the sheath. The core of Example 3 comprised 31 percent of the electrode weight and that of Example 4, 32.5 percent of the electrode weight; the cores were composed of the granular ingredients set forth below in the stated weight percentages of the electrodes:

| Ingredient | Example 3 | Example 4 |
|---|---|---|
| High Carbon Chromium Metal (88% Cr, 9.7% C) | 6.8 | 3.9 |
| Graphite | 4.7 | 1.8 |
| Ferrotitanium (70% Ti) | 11.8 | 5.9 |
| High Carbon Ferromanganese (79.2% Mn, 6.9% C) | 2.5 | — |
| Electrolytic Manganese | — | 15.9 |
| Calcium-Silicon Alloy (32.5% Ca, 61% Si) | 4.0 | 3.6 |
| Aluminum Metal | 0.9 | 1.0 |
| Magnesium Metal | 0.3 | 0.3 |

Overall, the core of Example 3 contained about 5.7% C, about 2.2% Mn, about 2.5% Si, about 6.1% Cr, about 8.2% Ti, and about 1.3% Ca by weight of the electrode; the core of Example 4 contained about 2.3% C, about 16.5% Mn, about 2.2% Si, about 3.5% Cr, about 4.1% Ti, and about 1.1% Ca by weight of the electrode. Both examples were drawn to 7/64" diameter and used to prepare self-shielded hard surfacing weld deposits under the conditions set forth for Example 1. In both cases smooth spray transfer was achieved, little or no weld metal porosity was observed and weld metal fluidity and tie-in were much improved over the prior art counterparts (which contained non-metallic core components as discussed above).

EXAMPLES 5 AND 6

To determine whether the effects of our inventive core additions extended to self-shielded tubular composite hard surfacing electrodes other than those containing titanium carbide, two such electrodes according to the invention were fabricated for producing TiC-free hard surfacing deposits of the white iron (Example 5) and martensitic (Example 6) types. In each example C1008 steel strip was used as the sheath material and the core constituted 35.5 percent of the electrode weight. The cores of Examples 5 and 6 were composed of the following listed granular ingredients in the stated weight percentages of the electrode:

| Ingredient | Example 5 | Example 6 |
|---|---|---|
| High Carbon Chromium Metal (88% Cr, 9.7% C) | 29.2 | — |
| Low Carbon Ferrochromium (73.2% Cr) | — | 8.0 |
| Graphite | 1.2 | — |
| Silicon Carbide | — | 1.1 |
| High Carbon Ferromanganese (79.2% Mn, 6.9% C) | — | 2.4 |
| Electrolytic Manganese | 0.7 | — |
| Low Carbon Ferromolybdenum (6.25% Mo) | — | 2.6 |
| Tungsten Metal | — | 1.6 |
| Iron Powder | — | 15.4 |
| Calcium-Silicon Alloy (32.5% Ca, 61% Si) | 3.2* | 3.2* |
| Aluminum Metal | 0.9 | 0.9 |
| Magnesium Metal | 0.3 | 0.3 |

*equal to about 1 percent Ca by weight of the electrode.

As with Examples 2 through 4, use of the electrodes of Examples 5 and 6 to produce self-shielded hard surfacing deposits under the conditions used with Example 1 showed smooth spray transfer, similar to that obtained with the TiC-bearing invention examples and clearly superior to the transfer characteristics of the corresponding prior art electrodes (which contained nonmetallic core additions as discussed above.) Weld metal soundness and fluidity were also good with the Example 5 and 6 electrodes, but these characteristics are also typically acceptable with TiC-free deposits from prior art electrodes.

EXAMPLE 7

A self-shielded tubular composite electrode was fabricated using the core composition of Example 2, but replacing the calcium-silicon alloy and magnesium metal with an alloy of 30% calcium and 70% magnesium in an amount of 1.8% of the electrode weight, equivalent to 0.55% Ca and 1.25% Mg. The combining formula set forth above gave the following result (1.25/0.61)+0.55+0+0=2.6, well within the intended range of from about 1 to about 3. The electrode was used to produce a hard surfacing deposit by the semi-automatic self-shielded process under the conditions set forth for Example 1, and showed the desired smooth spray transfer and good weld metal fluidity typical of other electrodes according to the invention. Presumably since the core did not contain any unalloyed magnesium, the bead had a slight amount of fine porosity, but the transfer characteristics of Example 7 were clearly as expected in accordance with the basic invention.

While we have described certain present preferred embodiments of the invention, it is to be distinctly understood that the invention is not limited thereto but may be otherwise variously embodied within the scope of the following claims.

We claim:

1. A self-shielded tubular composite arc welding electrode comprising a metallic outer sheath and a core within and enclosed by said sheath, the sheath and core together being balanced to produce a hard surfacing weld deposit and containing at least about 2.5 percent chromium by weight of the electrode, the core comprising an alloyed form of at least one of the metals magnesium, calcium, strontium and barium in percentages by weight of the electrode satisfying the following relationship:

$$\frac{\% \text{ Mg}}{0.61} + \% \text{ Ca} + \frac{\% \text{ Sr}}{2.18} + \frac{\% \text{ Ba}}{3.43} = 1 \text{ to } 3.$$

2. A tubular composite electrode as claimed in claim 1 wherein the core also includes, by weight of the electrode, about 0.9 percent to about 2.3 percent unalloyed aluminum metal and about 0.2 percent to about 0.4 percent unalloyed magnesium metal.

3. A self-shielded tubular composite arc welding electrode comprising a metallic outer sheath and a core within and enclosed by said sheath, the sheath and core together being balanced to produce a hard surfacing weld deposit and containing at least about 2.5 percent chromium by weight of the electrode, the core comprising about 1 to about 3 percent calcium by weight of the electrode, the calcium being in alloyed form.

4. A tubular composite electrode as claimed in claim 3 in which the calcium is in the form of a calcium-silicon alloy containing about 33 weight percent calcium and about 61 weight percent silicon.

5. A tubular composite electrode as claimed in claim 4 wherein the core also includes, by weight of the electrode, about 0.9 percent to about 2.3 percent unalloyed aluminum metal and about 0.2 percent to about 0.4 percent unalloyed magnesium metal.

6. A tubular composite electrode as claimed in any of claims 1, 4, or 5 in which the sheath and core together include free and combined forms of carbon and alloyed and unalloyed forms of manganese, silicon, chromium, molybdenum, titanium and iron in the following listed percentages by weight of the electrode: about 1.7 to about 3% C., about 1 to about 2.4% Mn, up to about 3% Si, about 6.2 to about 8.2% Cr, about 1 to about 2% Mo, about 4 to about 8% Ti, and at least about 65% Fe.

7. A tubular composite electrode as claimed in any of claims 1, 4 or 5 in which the sheath and core together include free and combined forms of carbon and alloyed and unalloyed forms of manganese, silicon, chromium, titanium and iron in the following listed percentages by weight of the electrode: about 4 to about 6% C., about 1.5 to about 2.9% Mn, up to about 3% Si, about 5.5 to about 7.5% Cr, about 6 to about 9% Ti and at least about 65% Fe.

8. A tubular composite electrode as claimed in any of claims 1, 4, or 5 in which the sheath and core together include free and combined forms of carbon and alloyed and unalloyed forms of manganese, silicon, chromium, titanium and iron in the following listed percentages by weight of the electrode: about 1.5 to about 3% C., about 15 to about 18% Mn, up to about 3% Si, about 2.5 to about 4.5% Cr, about 3 to about 7% Ti, and at least about 55% Fe.

* * * * *